(12) United States Patent
House et al.

(10) Patent No.: US 9,908,098 B2
(45) Date of Patent: Mar. 6, 2018

(54) HONEYCOMB FILTER ARTICLE AND METHODS THEREOF

(71) Applicant: Corning Incorporated, Corning, NY (US)

(72) Inventors: Keith Leonard House, Corning, NY (US); Zhihui Lv, Shanghai (CN)

(73) Assignee: Corning Incorporated, Corning, NY (US)

( * ) Notice: Subject to any disclaimer, the term of this patent is extended or adjusted under 35 U.S.C. 154(b) by 42 days.

(21) Appl. No.: 14/871,076

(22) Filed: Sep. 30, 2015

(65) Prior Publication Data

US 2016/0096163 A1 Apr. 7, 2016

Related U.S. Application Data

(60) Provisional application No. 62/060,236, filed on Oct. 6, 2014.

(51) Int. Cl.
*B01D 53/02* (2006.01)
*B01J 20/18* (2006.01)
(Continued)

(52) U.S. Cl.
CPC .............. *B01J 20/18* (2013.01); *B01D 53/02* (2013.01); *B01D 53/04* (2013.01);
(Continued)

(58) Field of Classification Search
CPC ........ B01D 2253/102; B01D 2253/106; B01D 2253/25; B01D 2253/304; B01D 2253/306; B01D 2253/311; B01D 2253/3425; B01D 2255/2073; B01D 2257/708; B01D 53/02; B01D 53/04; B01D 53/0407; B01J 20/06; B01J 20/18; B01J 20/20; B01J 20/28004; B01J 20/28011; B01J 20/28045; B01J 20/28059; B01J 20/28061; B01J 20/28064; B01J 20/28066
See application file for complete search history.

(56) References Cited

U.S. PATENT DOCUMENTS 4,402,717 A 9/1983 Izumo et al.
4,992,319 A 2/1991 Kurosawa et al.
(Continued)

FOREIGN PATENT DOCUMENTS

CN 101992001 3/2011
CN 103394247 11/2013
(Continued)

OTHER PUBLICATIONS

M. Suzuki, Fundamentals and applications, Carbon, vol. 32, Issue 4, 1994, pp. 577-586—abstract.
(Continued)

*Primary Examiner* — Christopher P Jones
(74) *Attorney, Agent, or Firm* — John L. Haack (57) ABSTRACT

A flow-through filter article, as defined herein, including:
a honeycomb and at least a portion of the honeycomb having a surface modification comprising:
a first adsorbent comprising an activated carbon;
a second adsorbent for a volatile organic compound, as defined herein; and
a binder.
Also disclosed is a method of making and using the filter article.

6 Claims, 4 Drawing Sheets

(51) Int. Cl.
*B01D 53/04* (2006.01)
*B01J 20/20* (2006.01)
*B01J 20/06* (2006.01)
*B01J 20/28* (2006.01)

(52) U.S. Cl.
CPC .......... *B01D 53/0407* (2013.01); *B01J 20/06* (2013.01); *B01J 20/20* (2013.01); *B01J 20/28004* (2013.01); *B01J 20/28011* (2013.01); *B01J 20/28045* (2013.01); *B01J 20/28059* (2013.01); *B01J 20/28061* (2013.01); *B01J 20/28064* (2013.01); *B01J 20/28066* (2013.01); *B01D 2253/102* (2013.01); *B01D 2253/106* (2013.01); *B01D 2253/25* (2013.01); *B01D 2253/304* (2013.01); *B01D 2253/306* (2013.01); *B01D 2253/311* (2013.01); *B01D 2253/3425* (2013.01); *B01D 2255/2073* (2013.01); *B01D 2257/708* (2013.01)

(56) References Cited

U.S. PATENT DOCUMENTS

| | | |
|---|---|---|
| 5,194,414 A | 3/1993 | Kuma |
| 5,310,593 A | 5/1994 | Tsujimoto et al. |
| 5,997,829 A | 12/1999 | Sekine et al. |
| 6,007,781 A | 12/1999 | Campbell et al. |
| 6,413,303 B2 | 7/2002 | Gelderland et al. |
| 7,666,507 B2 | 2/2010 | Ishikawa et al. |
| 2006/0141256 A1* | 6/2006 | Ishikawa ................ B01J 20/20 428/408 |
| 2008/0233039 A1* | 9/2008 | Hagemeyer .......... B01D 53/865 423/351 |
| 2008/0236389 A1 | 10/2008 | Leedy et al. |
| 2009/0178566 A1 | 7/2009 | Tschantz et al. |
| 2010/0004119 A1 | 1/2010 | Gadkaree et al. |
| 2010/0247851 A1* | 9/2010 | Miyata .................... B01J 35/04 428/116 |
| 2010/0263533 A1 | 10/2010 | Gadkaree et al. |
| 2012/0189489 A1* | 7/2012 | Kwon ..................... A61L 9/01 422/4 |
| 2012/0273410 A1 | 11/2012 | Hofenauer et al. |

FOREIGN PATENT DOCUMENTS

| | | |
|---|---|---|
| CN | 102284288 | 1/2014 |
| EP | 342598 | 11/1991 |
| EP | 1247559 | 10/2002 |
| EP | 1820554 | 4/2009 |
| GB | 2302826 | 2/1997 |
| JP | 2001321634 | 11/2001 |
| JP | 2002191682 | 7/2002 |
| JP | 2005209703 | 8/2005 |
| JP | 2008086870 | 4/2008 |
| KR | 2006020791 | 3/2006 |
| KR | 601094 | 7/2006 |
| KR | 2009067951 | 6/2009 |
| WO | 2013108117 | 7/2013 |

OTHER PUBLICATIONS

International Search Report, issued in connection with corresponding PCT application No. PCT/US2015/053146, dated Dec. 18, 2015.

* cited by examiner

HONEYCOMB FILTER ARTICLE AND METHODS THEREOF

This application claims the benefit of priority under 35 U.S.C. § 119 of U.S. Provisional Application Ser. No. 62/060,236 filed on Oct. 6, 2014 the content of which is relied upon and incorporated herein by reference in its entirety.

CROSS-REFERENCE TO RELATED APPLICATIONS

The present application is related to commonly owned and assigned U.S. Application No. 62/060,123, filed concurrently herewith, entitled "NON-EXTRUDED ACTIVATED CARBON HONEYCOMB STRUCTURES," but does not claim priority thereto.

The entire disclosure of each publication or patent document mentioned herein is incorporated by reference.

BACKGROUND

The disclosure relates to a honeycomb filter article, an air purifier system including the filter article, and to a method of making and using the article.

SUMMARY

In embodiments, the disclosure provides a coated honeycomb filter article, an air purifier system including the filter article, and to a method of making and using the article.

In embodiments, the disclosure provides a honeycomb structured filter article having a relatively low cost and a low pressure drop, which filter article can be used in an air purifier system, such as stand-alone home air purifier system, that circulates ambient room air through the filter article to remove, for example, VOCs from the air.

BRIEF DESCRIPTION OF THE DRAWINGS

In embodiments of the disclosure.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Volatile organic compound," "VOC," "VOCs," or like terms refer to an organic chemical that has a high vapor pressure at ordinary room temperature. The VOC's high vapor pressure results from a low boiling point, which causes a large number of molecules to evaporate or sublimate from the liquid or solid form of the compound and enter the surrounding air. For example, formaldehyde, which evaporates from certain paint formulations, has a boiling point of −19° C. (−2° F.) and high vapor pressure of about 360 mm Hg at 25° C. and formalin (aqueous formaldehyde) has a boiling point which varies with its concentration and a Reid vapor pressure of 0.09 psia. VOCs are compounds that appear, for example, in a gas chromatogram between and including n-hexane and n-hexadecane. Compounds appearing earlier are called very volatile organic compounds (VVOC) appearing later are called semi-volatile organic compounds (SVOC). The present disclosure contemplates an article and method of use that is active for capturing VOCs, and at least some VVOCs and SVOCs.

"Complementary absorbent material" and like terms, refer to, for example, a second absorbent material that complements or supplements the first absorbent (i.e., activated carbon) by absorbing some specific VOC(s) to higher efficiencies than the first absorbent alone. For example, for VOCs of molecular structures having less than 5 carbon atoms, a CBV 3002 type zeolite is a better absorbent than activated carbon. So that the filter exhibits good efficiency in absorbing these types VOCs and others, then CBV 3002 type zeolite serves as a complementary absorbent.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The articles and methods of the disclosure can include any value or any combination of the values, specific values, more specific values, and preferred values described herein, including explicit or implicit intermediate values and ranges.

In embodiments, the disclosure provides a low cost and low pressure drop honeycomb structured filter article, which removes VOCs from air. This filter article is used in a system, such as stand-alone home air purifier system, that circulates room air through the filter article. VOC removal is accomplished via the use of high surface area adsorbent materials present in a coating on the surfaces of the honeycomb channel walls within the filter article. Relatively small dimensions of the honeycomb channels, for example, 1 to 3 mm, cause the gaseous impurities in the air passed through the filter article to readily diffuse to the walls of the channels and then into the coating where the impurities then contact and become trapped by the adsorbent materials. The presence within the coating of more than one type of adsorbent material enables removing from the air a variety of different VOC types. The optional presence in the coating of a catalyst specific to the room temperature oxidation of formaldehyde enables simultaneous removal of formaldehyde from the air.

In embodiments, the disclosure provides a method to remove volatile organic compounds (VOC), such as formaldehyde, and other vapor contaminates from the air in interior spaces (e.g., indoor living space, office space, recreational space) with a filter article and filter system incorporating the filter article. These contaminates can be emitted from, for example, construction materials or from furnishings in the interior space. These contaminants pose health threats.

Various stand-alone air purification systems which remove vapor contaminates from indoor living spaces have been developed. A number of these systems are commercially manufactured and sold under various trade names. These systems typically consist of a blower or fan which pulls in room air, sends the air through an adsorber unit inside the system, and then sends the air back into the room. The most common adsorber units in the incumbent air purifier systems are packed beds consisting of particles of activated carbon. To reduce the high pressure drop due to the packed bed structure, sometimes relatively large size (e.g., about 1 mm) carbon particles are used, and sometimes the packed bed is made to be thin with a large frontal area, which is sometimes done by distributing the carbon between porous sheets (e.g., paper) and then folding and pleating the resulting sandwich so that it can be fit inside of the stand-alone purification systems. Upon passing through the air purifier system, some of the vapor contaminants (typically as much as 60 to 80%) are adsorbed and are removed from the air.

There are issues with the air purifier systems currently on the market, including for example:

A high cost of unit fabrication due to the complex design, such as layers of powders contained between fabric walls that are supported with skeletal structures that are molded or otherwise formed. At a certain point the adsorber units in the air purifier unit become saturated with contaminates. The saturated units need to be replaced and the replacement cost is high.

A high volume of air flow is needed to keep the vapor contaminant levels in the interior space low. The pressure drop across the adsorber unit is too high. The energy consumption for proper air flow rates is high and the fan noise level is high.

The air purifier systems are unable to accomplish high removal efficiencies across diverse VOC types.

The air purifier systems are unable to remove formaldehyde and remove other VOCs with a single unit.

Figure 1:
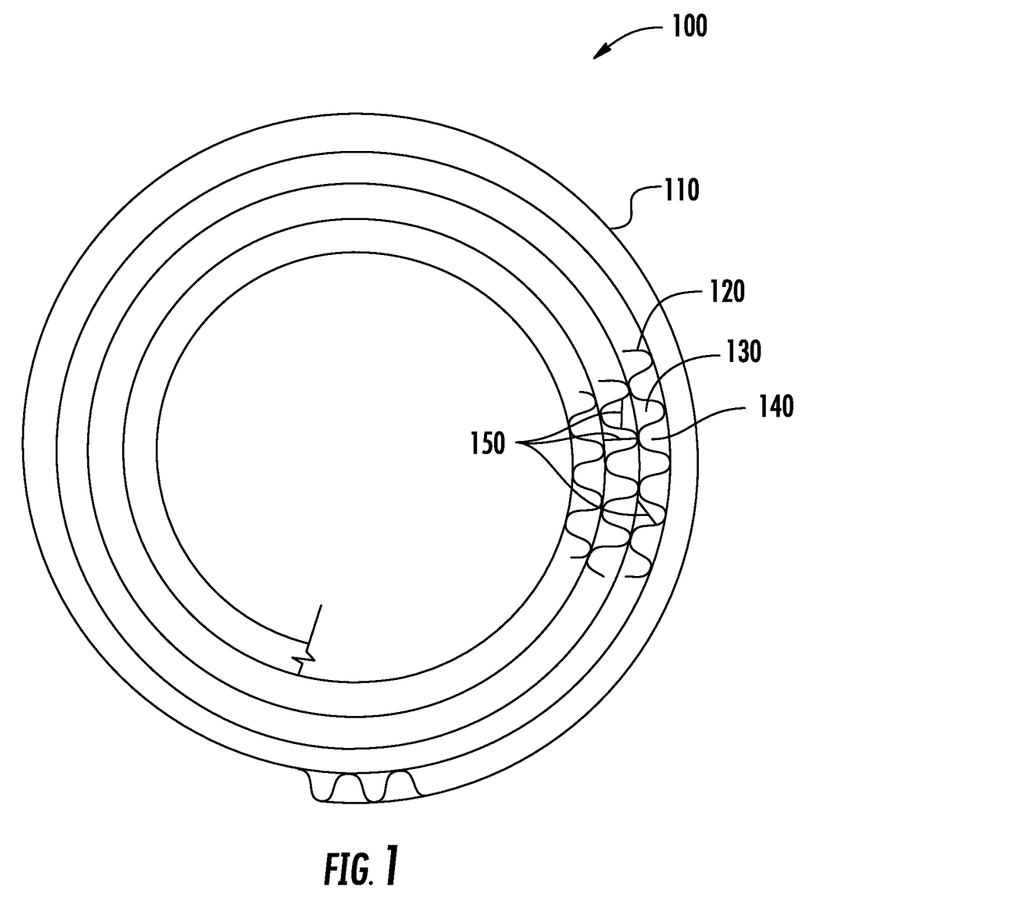
FIG. 1 shows an exemplary filter article (100), in cross-section, having a corrugated paper sheet coiled to form a honeycomb structure.

Referring to the Figures, FIG. 1 shows an exemplary filter article (100), in cross-section, having a corrugated paper sheet coiled to form a honeycomb structure. The interior of the honeycomb structure is omitted in FIG. 1 for clarity. The honeycomb structure can include, for example: a paper backing sheet (110), a corrugated paper sheet (120) attached to the paper backing sheet (110), a plurality of concave open channels (130), and a plurality of convex open channels (140). The channel width dimension (150) or diameter of the channels, can be, for example, from 0.5 to 3 mm.

The filter article (100) can have a cylindrical shape, and can have, for example, a six inch (6") outer diameter and a six inch (6") length or height. The paper honeycomb structure can be coated with a mixture of an activated carbon, a zeolite CBV 3002, a high surface area $MnO_2$, and a polyvinylalcohol (PVA) binder.

Figure 2:
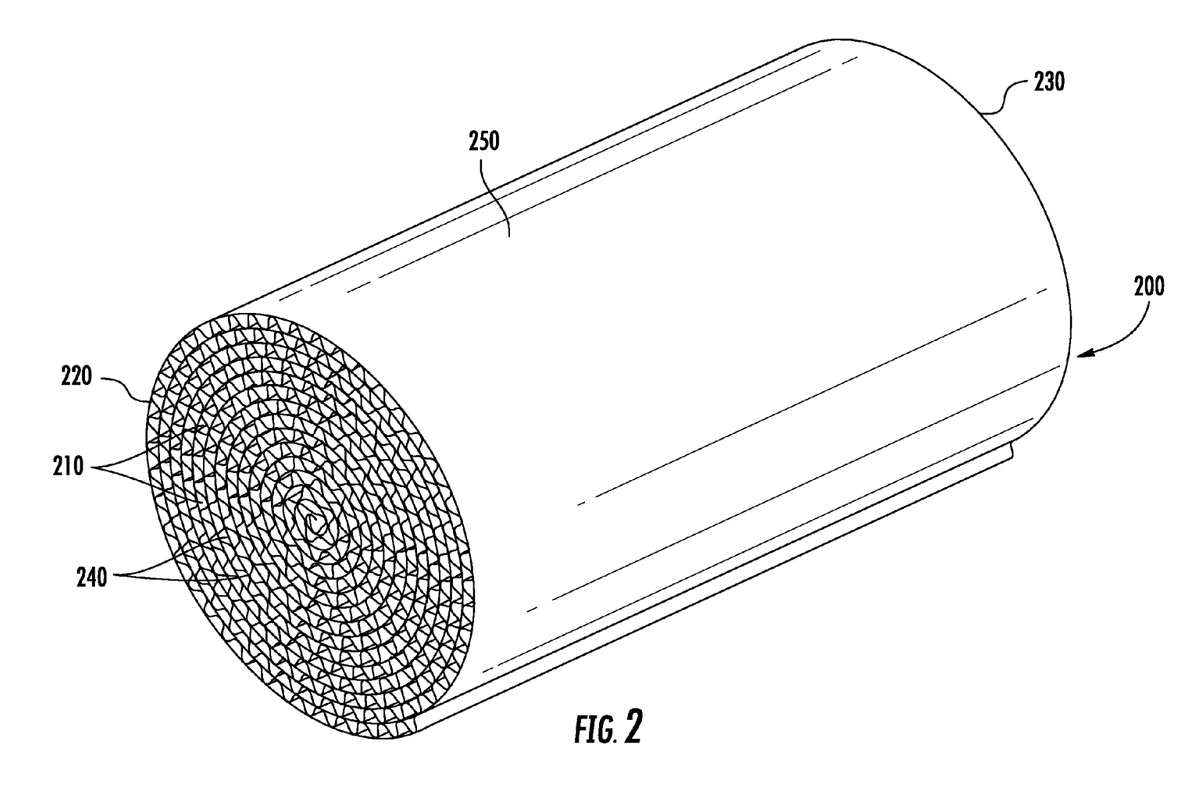
FIG. 2 shows an isometric view of the filter article (100) of FIG. 1.

FIG. 2 shows an isometric view of the filter article (100) of FIG. 1 having, for example, a corrugated cell density of from about 100 to 1600 cells per square inch (cpsi), of from about 200 to 1200 cpsi, and of from about 200 to 800 cpsi, including intermediate values and ranges. The corrugated filter article (200) can include a rolled paper backing sheet (210), a corrugated paper sheet (220) attached to the paper backing sheet (210), having a plurality of concave open channels and a plurality of convex open channels. The filter article (200) can have a cylindrical shaped body (250), and can have, for example, a six inch (6") outer diameter and a six inch (6") length or height. The filter article (200) can have a first inlet face and second outlet face (230).

Figure 3:
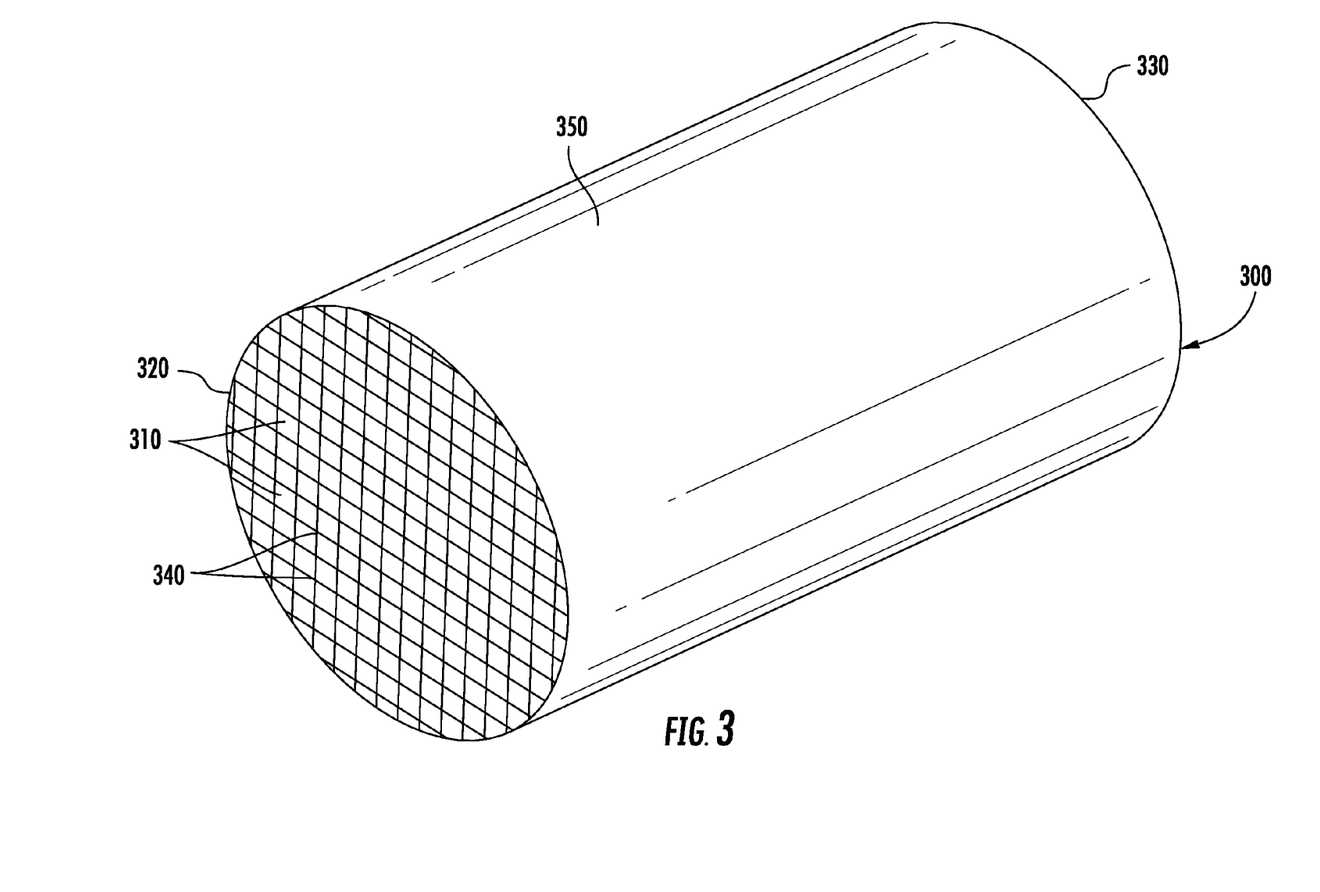
FIG. 3 shows an isometric view of an alternative honeycomb structure filter article (300).

FIG. 3 shows an isometric view of an alternative honeycomb structure filter article (300) having, for example, a square honeycomb cell density of from about 200 to 2,000 cells per square inch (cpsi), of from about 200 to 1200 cpsi, and of from about 200 to 800 cpsi, including intermediate values and ranges. The alternative filter article (300) can have a cylindrical shape, and can have, for example, a six inch (6") outer diameter and a six inch (6") length or height, and having a cells per square inch (cpsi) of from 100 to 800. The alternative filter article (300) can be an extruded ceramic material, such as cordierite, that is entirely coated with of a mixture of, for example, an activated carbon, a zeolite CBV 3002, and a polyvinylalcohol (PVA) binder.

The extruded filter article (300) can include a plurality of inlet cells (310) on the first end face (320). The extruded filter article (300) can have, for example, a plurality of walls (340), which walls extend from the first inlet face (320) through to the second outlet face (330) of a cylindrical shaped body (350), and can have, for example, a six inch (6") outer diameter and a six inch (6") length or height.

Figure 4:
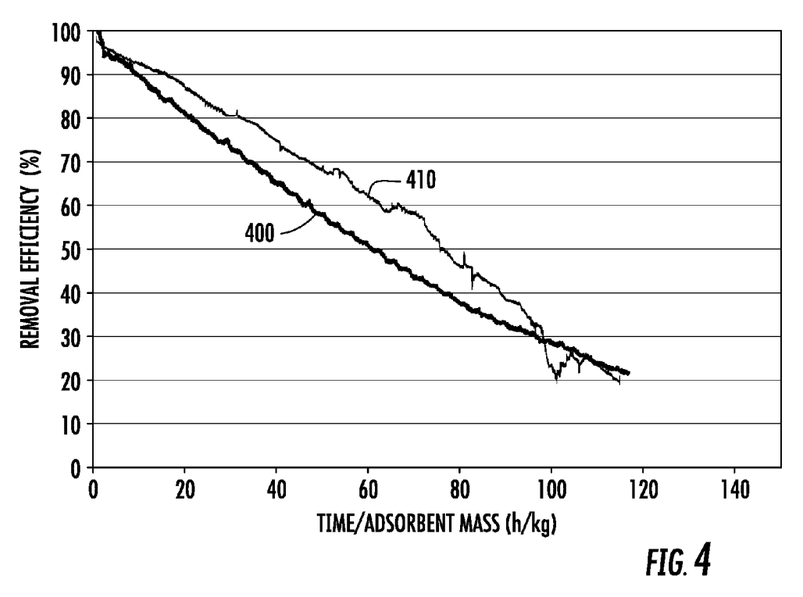
FIG. 4 is a plot of test data showing VOC adsorption performance for an adsorption filter article having the corrugated paper honeycomb structure (400) of FIG. 1 compared to a commercial adsorption filter article (410).

FIG. 4 is a plot of test data showing VOC adsorption performance for an adsorption filter article having the corrugated paper honeycomb structure (400) of FIG. 1 compared to a commercial adsorption filter article (410).

The corrugated honeycomb structure (400) consists of 166 g of corrugated paper coated with 40 g zeolite (CBV 3024E from Zeolist), 286 g of ACBL (1300 $m^2$/g, BL type from Calgon Carbon), and 62 grams of polyvinyl alcohol (PVA) (from Elmer's Products).

The comparative commercial adsorption filter article (410) was an IQair unit coated with about 1.4 kg activated carbon. The IQair filter cartridge, a Filter No: F2; Model No.: 102401600, available from iallergy.com, was made of media including: about 3 pounds of granular activated carbon in an amount of about 32 wt %, an activated alumina in an amount of about 40 wt %, and impregnated with potassium permanganate in an amount of about 5 wt % based on the total weight of the surface modification, or alternatively, based on the total weight of the filter article. The test conditions were: 1,200 liters per min air flow with an inlet concentration of 830 ppb benzene.

The VOC removal efficiencies were comparable for the paper honeycomb structure (400) and the commercial adsorption filter article (410). However, advantageously, the pressure drop across the paper honeycomb structure (400) was less than about 10 Pa and was less than about 50% of the pressure drop of about 20 Pa across the commercial unit.

In embodiments, the disclosure provides a flow-through filter article comprising:
  a honeycomb; and
  at least a portion of the honeycomb having a surface modification comprising:
    a first adsorbent comprising an activated carbon;
    a second adsorbent for a volatile organic compound comprising a particulate inorganic having a high surface area of from 50 to 500 m²/g selected from at least one of: a sol-gel; a synthetic or natural zeolite, a precipitated metal oxide, a fumed metal oxide; or a combination thereof; and
    a binder, which binder provides added integrity and strength to the surface modification or surface coating and to the honeycomb structure.

In embodiments, the article can further comprise, for example, a $MnO_2$ catalyst, which $MnO_2$ catalyst is effective in oxidizing formaldehyde at room temperature, on at least a portion of the honeycomb, in an amount of 0.5 to 10 wt % based on the total weight of the surface modification.

In embodiments, the honeycomb can comprises, for example, at least one of:
  a corrugated structure comprised of cellulose, paper, plastic, or a combination thereof, wherein the corrugated structure is rolled, stacked, or combination thereof;
  an extruded and fired ceramic body having face cells and corresponding channels extending into and through the body;
  a honeycomb having plugs in adjacent cells;
  a honeycombs free of plugs in adjacent cells;
  or combinations thereof.

In embodiments, the first adsorbent comprising or consisting of an activated carbon can have a particle size, for example, of from about 1 to about 100 microns, and a surface area of from 500 to 1,600 m² per gram, and can be present in an amount of, for example, from 50 to 95 wt % based on the total weight of the surface modification.

In embodiments, the second adsorbent, or complementary adsorbent, can be, for example, a microporous aluminosilicate (e.g., a zeolite), for example, in an amount of from 5 to 50 wt %, such as from 10 to 30 wt %, including intermediate values and ranges, based on the total weight of the surface modification.

In embodiments, the binder can be, for example, a polyvinylalcohol (PVA), in an amount, for example, of from 3 to 20 wt % based on the total weight of the surface modification.

In embodiments, the honeycomb can have one or more of the following characterizing or defining features, for example:
  a total porosity (% P) of from 20 to 60%;
  a BET surface area of from 200 m²/g to 1600 m²/g;
  a cell density of from 100 to 2,000 cpsi, such as 100 to 1,000 cpsi, and 100 to 800 cpsi;
  a density of from 0.3 to 0.8 g/cm³; and
  a wall thickness of from 30 to 300 micrometers, including intermediate values and ranges for any of the preceding ranges.

In embodiments, the porous honeycomb body of the disclosure has a total porosity as measured by, for example, mercury porosimetry. For example, the honeycomb body of the disclosure can have a total porosity P greater than or equal to 20 such as a total porosity of at least 20%, at least 30%, at least 40%, at least 50%, and even at least 60%, including intermediate values and ranges. Additionally or alternatively, the porous ceramic bodies can have a total porosity of from about 20% to about 60%, including intermediate values and ranges.

In embodiments, the disclosure provides a method of using the above mentioned article, comprising:
  installing the article in a filter apparatus; and
  causing relative motion between the installed filter article and a fluid containing or potentially containing a contaminant.

In embodiments, the disclosed filter article can be, for example, a paper honeycomb structure having a pressure drop of, for example, less than about 10 Pa, which is about 50% less compared to the pressure drop of about 20 Pa across a commercial unit. In embodiments, the disclosed filter article, filter system, and methods thereof are advantaged by, for example:
  having low pressure drop properties compared to commercial filter systems;
  having low cost materials of construction and low fabrication costs; and
  a ceramic honeycomb version is suitable for regeneration and reuse at elevated temperatures.

The small diameter of the honeycomb channels of the filter articles of the disclosure permit effective mass transport of contaminants from a flowing stream of air to the adsorbent materials and catalyst on the surface of the filter article while avoiding a high pressure drop that is often seen with air filter that stream the air through packed beds.

In embodiments, the article can be a paper honeycomb structure, and in use as a filter can have a pressure drop (i.e., back pressure) of, for example, less than about 50 Pa, which pressure drop is about 50% less compared to the pressure drop of about 100 Pa across a commercial unit (i.e., an IQAir filter: GC MultiGas).

$MnO_2$ Catalyst

The optional high surface area $MnO_2$ catalyst of the disclosure is effective in oxidizing formaldehyde at room temperature. This catalyst has a much lower cost than catalysts made with precious metals. A procedure for preparing this catalyst includes: preparing a first solution by dissolving 57 g $MnSO_4 \times H_2O$ (29 wt % by Mn) into 800 cc of water; preparing a second solution by dissolving 31 g of $KMnO_4$ into 800 cc of water; adding the second solution dropwise to first solution with stirring. A redox reaction according to the equation:

$$3MnSO_4 \times H_2O + 2KMnO_4 + 2H_2O \rightarrow 5MnO_2 + 2K^+ + 3SO_4^- + 4H^+ + xH_2O$$

occurs between the reactants, and results in 45 g of fine particle size $MnO_2$ being formed having a surface area of about 150 m²/g.

Coating the Honeycomb Structure

An example procedure for preparing and applying the porous coating of activated carbon plus other materials to the honeycomb structure includes: making a slurry by first preparing an aqueous solution of the $MnO_2$ catalyst by combining 45 g of the fine particle $MnO_2$ in 1,600 g of water; second, adding 2,700 g of water to the solution; third, mixing in 1000 g of finely divided high surface area (1300 m²/g) activated carbon powder, 100 grams of finely divided zeolite (type CBV 3002) and 430 grams of PVA glue (50% solids/50% water); fourth, dipping the honeycomb into the coating slurry. The dipped honeycomb is removed, shaken, and blown out to remove excess coating slurry. Air is blown through the structure until the coating is dry. The resulting coating will be rigid and porous. The dipping and drying were repeated to add additional layers as desired. FIG. 2 shows an illustration of of a prototype filter article made by starting with a rolled or coiled paper honeycomb structure and then coating it accordance with this example procedure.

EXAMPLES

The following Examples demonstrate making, use, and analysis of the disclosed filter article and filter system, and methods of making in accordance with the above general procedures.

Example 1

Coiled Corrugated Paper Honeycomb Filter

The filter article of this example is a rolled corrugated paper honeycomb structure indicated in FIG. 1, having its channel walls coated with an activated carbon (first adsorbent), a zeolite (second adsorbent), a high surface area $MnO_2$ catalyst, and a PVA based binder. An actual prototype of the filter article is illustrated in FIG. 2.

Example 2

Extruded Ceramic Honeycomb Filter

The filter article of this example is a die extruded ceramic honeycomb structure having rectangular cross-section channels, and channel diameters of about 1 mm. This honeycomb structure has its channel walls coated with an activated carbon, a secondary adsorbent, and a binder. An actual prototype of this extruded ceramic honeycomb filter article structure is illustrated in FIG. 3. The extruded cordierite (a magnesium alumino silicate ceramic material) honeycomb structure was produced by a die extrusion process and then fired.

Example 3

Stacked Corrugated Paper Honeycomb Filter

This example is the same as Example 1 with the exception that the honeycomb structure consists of flat sheets of from about 10 to about 100 sheets of corrugated paper that are stacked atop one another and the sheets are bound together with glue such as polyvinyl alcohol. Exemplary dimensions of a stacked corrugated paper honeycomb filter are, for example, a height of from 1 to 24 in, a length of from 1 to 24 in, and a width of from 1 to 24 in, such as 6 in×6 in×6 in.

Example 4

VOC Adsorption Test of the Honeycomb Structure

Initially, there was a concern that the adsorption capacity of the activated carbon on the filter articles of the disclosure would be significantly reduced in the presence of a binder (e.g., 430 grams of PVA based binder foregoing coating procedure) or would be significantly reduced with the adsorbents being changed from powder form to coating form. Unexpectedly, the capacity of the adsorbent material was essentially unchanged going from powder form to coating form. The adsorbent tests involved measuring the adsorptive capacity of two different samples upon exposure to the same air and VOC mixture in a closed chamber (the VOC was benzene). Sample 1 was a piece of coated paper honeycomb made according to the above example procedure, of size that contained 100 grams of activated carbon plus 10 grams of zeolite. Sample 2 was an activated carbon and zeolite from the same original powder lots, an in the same amounts as in Sample 1, but with those materials still in unprocessed powder form and containing no added binder or other components. Sample 1 and sample 2 absorbed the same amount of VOC to within our measurement accuracy of +/−5%.

A prototype filter article of the disclosure was made in accordance with the example procedure above, and was compared with a commercial adsorption unit for performance in removing a VOC (e.g., benzene at 830 ppb concentration) from an airstream. The commercial sample was a cylindrical cartridge of having a 5" diameter×5" length containing an annular region packed bed of about 1 mm sized activated carbon. The prototype was as illustrated in FIG. 2 and was made in accordance with the preparative example procedure above. The commercial sample contained about 1.4 kg of activated carbon. The prototype of the disclosure contained about 0.25 kg of adsorbent materials (91% activated carbon and 9% zeolite). In a comparison test, the air containing a VOC was blown through the filter articles at a rate of 1,200 liters/min and the adsorption efficiency was determined by measuring the VOC level in the outlet stream. The results of the test are shown graphically in FIG. 4. Because the commercial sample (410) and the prototype (400) contained different amounts of adsorbent, the rate at which the adsorption or removal efficiency drops off differs. For a 1:1 comparison, the plot in FIG. 4 shows adsorption efficiency versus time/A, where A is the adsorbent amount. When plotted in this manner the data demonstrate that both the commercial and the prototype samples perform comparably in removing the VOC. Both filters start with adsorption efficiencies of 100%. Then as time progresses the efficiencies of the filters samples drop off as the adsorbent becomes filled. That the curves reasonably well overlay one another indicates the two samples perform essentially the same. The significant difference between the commercial unit and the prototype unit is the pressure drop. The prototype showed a pressure drop of less than 50% of the commercial unit. This lower pressure drop is one of the key advantages of the present invention.

The disclosure has been described with reference to various specific embodiments and techniques. However, it should be understood that many variations and modifications are possible while remaining within the scope of the disclosure.

What is claimed is:

1. A flow-through filter article comprising:
   a honeycomb; and
   at least a portion of the honeycomb having a coating of a mixture of:
      a first adsorbent comprising an activated carbon in an amount of 50 to 95 wt % based on the total weight of the coating, the activated carbon having a particle size of 1 to 100 microns, and a surface area of from 500 to 1,600 m² per gram;
      a second adsorbent for a volatile organic compound comprising a particulate microporous aluminosilicate in an amount of from 5 to 50 wt % based on the total weight of the coating, and inorganic having a high surface area of from 50 to 500 $m^2/g$; and a water soluble polyvinylalcohol binder in an amount of 3 to 20 wt % based on the total weight of the coating.

2. The article of claim 1 further comprising a $MnO_2$ catalyst on at least a portion of the honeycomb, in an amount of 0.5 to 10 wt % based on the total weight of the coating.

3. The article of claim 1 wherein the honeycomb comprises at least one of:
   a corrugated structure comprised of cellulose, paper, plastic, or a combination thereof, wherein the corrugated structure is rolled, stacked, or combination thereof;
   an extruded and fired ceramic body having face cells and corresponding channels extending into and through the body;
   a honeycomb having plugs in adjacent cells;
   a honeycombs free of plugs in adjacent cells; or combinations thereof.

4. The article of claim 1 wherein the honeycomb has:
   a total porosity (% P) of from 20 to 60%;
   a BET surface area of from 200 to 1600 $m^2/g$;
   a cell density of from 100 to 2,000 cpsi;
   a bulk density of from 0.3 to 0.8 $g/cm^3$; and
   a wall thickness of from 50 to 300 micrometers.

5. A method of using the article of claim 1, comprising:
   installing the article in a filter apparatus; and
   causing relative motion between the installed filter article and a fluid containing or potentially containing a contaminant.

6. The method of claim 5 wherein the article is a paper honeycomb structure and the pressure drop is less than about 10 Pa.

* * * * *

UNITED STATES PATENT AND TRADEMARK OFFICE
CERTIFICATE OF CORRECTION

PATENT NO. : 9,908,098 B2
APPLICATION NO. : 14/871076
DATED : March 6, 2018
INVENTOR(S) : Keith Leonard House et al.

Page 1 of 1

It is certified that error appears in the above-identified patent and that said Letters Patent is hereby corrected as shown below:

In the Claims

In Column 9, Lines 1-2, Claim 1, delete "inorganic having a high surface" and insert -- having a surface --, therefor.

Signed and Sealed this
Third Day of June, 2025

Coke Morgan Stewart
*Acting Director of the United States Patent and Trademark Office*